(12) United States Patent
Ruberte Sanchez et al.

(10) Patent No.: US 8,607,577 B2
(45) Date of Patent: Dec. 17, 2013

(54) ATTACHING CERAMIC MATRIX COMPOSITE TO HIGH TEMPERATURE GAS TURBINE STRUCTURE

(75) Inventors: Jose E. Ruberte Sanchez, Jupiter, FL (US); Mitchell Aaron Riccione, Middletown, CT (US); Jocelyn Charis Glispin, Plainville, CT (US)

(73) Assignee: United Technologies Corporation, Hartford, CT (US)

( * ) Notice: Subject to any disclaimer, the term of this patent is extended or adjusted under 35 U.S.C. 154(b) by 1058 days.

(21) Appl. No.: 12/624,523

(22) Filed: Nov. 24, 2009

(65) Prior Publication Data
US 2011/0123323 A1 May 26, 2011

(51) Int. Cl.
*F02C 7/20* (2006.01)
(52) U.S. Cl.
USPC .............. 60/796; 60/770; 60/752; 415/200; 403/406.1; 411/544; 16/2.1
(58) Field of Classification Search
USPC ........... 60/752–760, 770, 771, 796, 799, 800; 239/265.39; 415/200, 208.1; 403/408.1; 411/544, 338; 16/2.1, 2.2, 16/2.3, 2.5
See application file for complete search history.

(56) References Cited

U.S. PATENT DOCUMENTS

| | | | |
|---|---|---|---|
| 2,915,152 A * | 12/1959 | Graham | 403/288 |
| 4,309,123 A * | 1/1982 | Moore | 403/408.1 |
| 5,249,419 A | 10/1993 | Landhuis | |
| 5,484,105 A | 1/1996 | Ausdenmoore et al. | |
| 5,779,152 A | 7/1998 | Renggli et al. | |
| 6,042,315 A | 3/2000 | Miller et al. | |
| 6,904,757 B2 * | 6/2005 | Mitchell et al. | 60/800 |
| 7,007,483 B2 | 3/2006 | Peters | |
| 7,117,682 B1 | 10/2006 | Sevi et al. | |
| 7,225,622 B2 | 6/2007 | Petty et al. | |
| 7,261,489 B2 * | 8/2007 | Arbona et al. | 403/381 |
| 7,377,099 B2 | 5/2008 | Cowan et al. | |
| 7,546,738 B2 | 6/2009 | Peters | |
| 7,555,904 B1 | 7/2009 | Osga et al. | |
| 7,849,696 B2 * | 12/2010 | De Sousa et al. | 60/804 |
| 8,454,290 B2 * | 6/2013 | Schaser et al. | 411/544 |
| 2003/0123953 A1 | 7/2003 | Razzell | |
| 2007/0220735 A1 | 9/2007 | Arbona et al. | |
| 2008/0078163 A1 | 4/2008 | Burdick et al. | |

OTHER PUBLICATIONS

European Search Report for European Patent Application No. 10251991.5 completed on Jun. 24, 2013.

* cited by examiner

*Primary Examiner* — William H Rodriguez
(74) *Attorney, Agent, or Firm* — Carlson, Gaskey & Olds, PC

(57) ABSTRACT

An assembly for use in a gas turbine engine has an underlying metal sheet, and at least one ceramic matrix composite tile attached to the underlying metal sheet with at least one fastener assembly. The panel fastener assembly includes a fastener having a threaded portion extending rearwardly from a head, which has a frustoconical surface facing the threaded portion. The frustoconical surface is received in a frustoconical bore in the ceramic matrix composite panel. A bushing is positioned on an opposed side of the metal sheet from the ceramic matrix composite panel. The bushing has a flange extending away from the metal sheet. A sleeve is received about the threaded portion of the fastener, and extends away from the panel, beyond the metal sheet. The sleeve has a lip extending radially outwardly toward the flange on the bushing, such that the flange on the bushing extends beyond a space defined between the lip and a seating surface on the bushing. A wave spring is received within the cavity.

9 Claims, 5 Drawing Sheets

ATTACHING CERAMIC MATRIX COMPOSITE TO HIGH TEMPERATURE GAS TURBINE STRUCTURE

This invention was made with government support under Contract No. F33615-03-D-2354 awarded by the United States Air Force. The Government may therefore have certain rights in this invention.

BACKGROUND OF THE INVENTION

This application relates to a fastener system which is relatively simple to assemble, and which is utilized to attach a ceramic matrix component to an underlying metal surface in a gas turbine engine.

Gas turbine engines are known and typically include a compressor which compresses air and delivers it downstream into a combustion section. The compressed air is mixed with fuel and combusted in the combustion section. Hot products of combustion pass from the combustion section downstream over a turbine rotor, and then outwardly through a nozzle. The nozzle includes a plurality of flaps that can be pivoted to change the orientation and size of the nozzle.

The nozzle is typically provided with static side walls having a liner which is operable to resist damage from the very high temperature gases leaving the nozzle. Prior art nozzles have required frequent replacement, and thus, recently ceramic matrix composite materials have been proposed for the liners. Ceramic matrix composite components are attached to underlying metal. However, there is a challenge with fastening the two materials together, as they have very different coefficients of thermal expansion.

SUMMARY OF THE INVENTION

An assembly for use in a gas turbine engine has an underlying metal sheet, and at least one ceramic matrix composite tile attached to the underlying metal sheet with at least one fastener assembly. The panel fastener assembly includes a fastener having a threaded portion extending rearwardly from a head, which has a frustoconical surface facing the threaded portion. The frustoconical surface is received in a frustoconical bore in the ceramic matrix composite panel. A bushing is positioned on an opposed side of the metal sheet from the ceramic matrix composite panel. The bushing has a flange extending away from the metal sheet. A sleeve is received about the threaded portion of the fastener, and extends away from the panel, beyond the metal sheet. The sleeve has a lip extending radially outwardly toward the flange on the bushing, such that the flange on the bushing extends beyond a space defined between the lip and a seating surface on the bushing. A wave spring is received within the cavity.

These and other features of the present invention can be best understood from the following specification and drawings, the following of which is a brief description.

DETAILED DESCRIPTION OF THE PREFERRED EMBODIMENT

Figure 1:
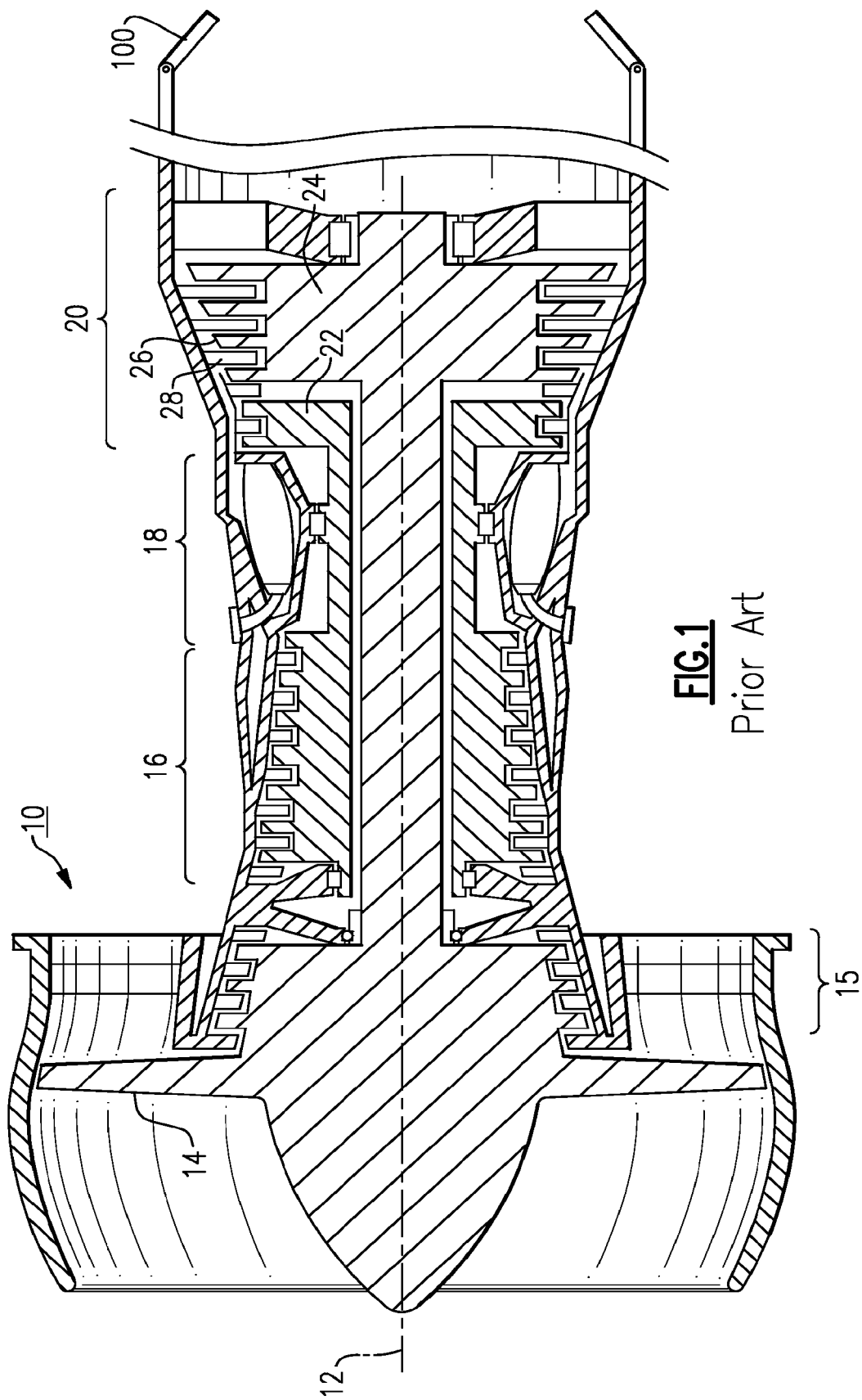
FIG. 1 shows a standard gas turbine engine.

A gas turbine engine 10, such as a turbofan gas turbine engine, circumferentially disposed about an engine centerline, or axial centerline axis 12 is shown in FIG. 1. The engine 10 includes a fan 14, compressor sections 15 and 16, a combustion section 18 and a turbine 20. As is well known in the art, air compressed in the compressor 15/16 is mixed with fuel and burned in the combustion section 18 and expanded in turbine 20. The turbine 20 includes rotors 22 and 24, which rotate in response to the expansion. The turbine 20 comprises alternating rows of rotary airfoils or blades 26 and static airfoils or vanes 28. In fact, this view is quite schematic, and blades 26 and vanes 28 are actually removable. As shown, a downstream end 100 of the engine includes a nozzle, which is defined by a plurality of flaps, and static side walls. The side walls are not illustrated in this view, and the nozzle is illustrated only in a schematic fashion. However, such structure is known in the art. It should be understood that this view is included simply to provide a basic understanding of the sections in a gas turbine engine, and not to limit the invention. This invention extends to all types of turbine engines for all types of applications.

Figure 2:
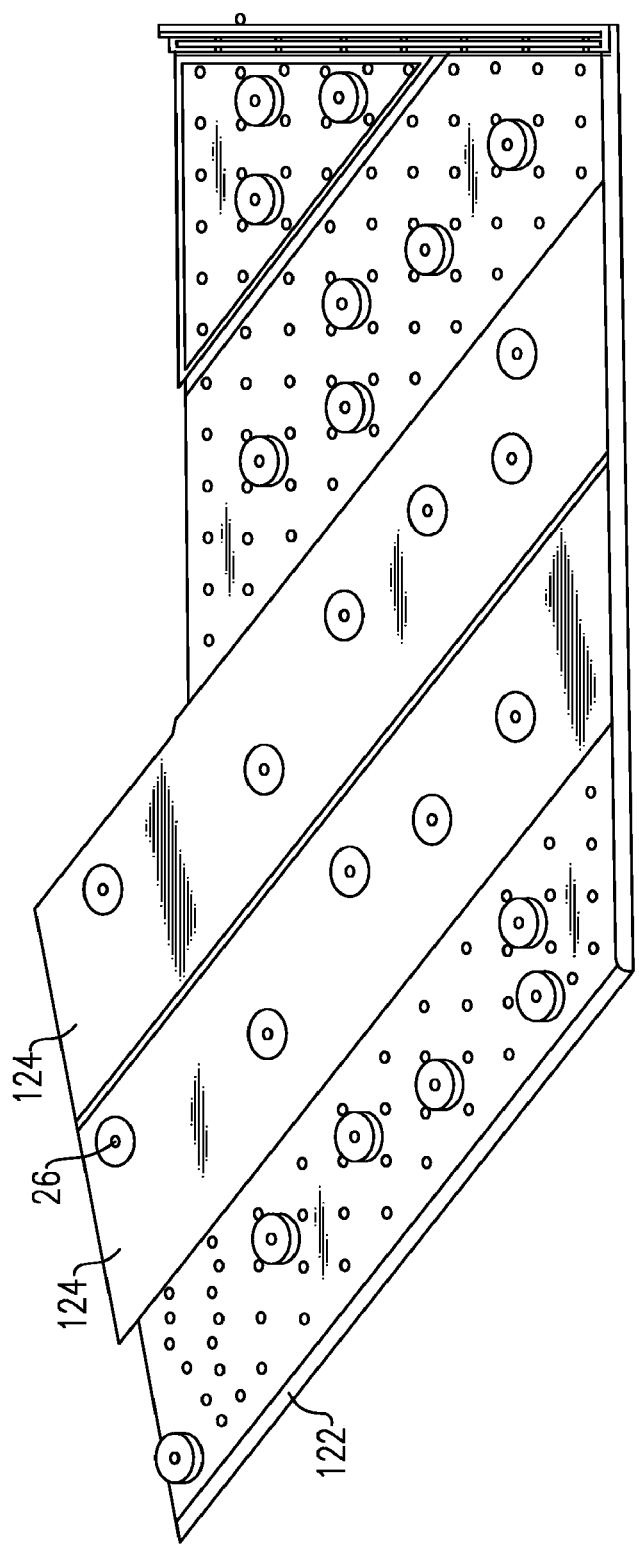
FIG. 2 shows the attachment of ceramic matrix component liners in a nozzle.

FIG. 2 shows a portion of the nozzle, and in particular one of a plurality of nozzle side walls. As shown in FIG. 2, the side walls include an underlying metal sheet 122, and ceramic matrix composite tiles or panels 124 attached to the outer surface of the metal sheet 122. A plurality of fasteners 26 secure the ceramic matrix composite tiles. While a structure is shown specifically on a static side wall, it may have application on pivoting flaps as part of the nozzle, or for any number of other applications within a gas turbine engine.

The material utilized for the ceramic matrix component may be as known in the art, and forms no portion of this invention.

Figure 3A:
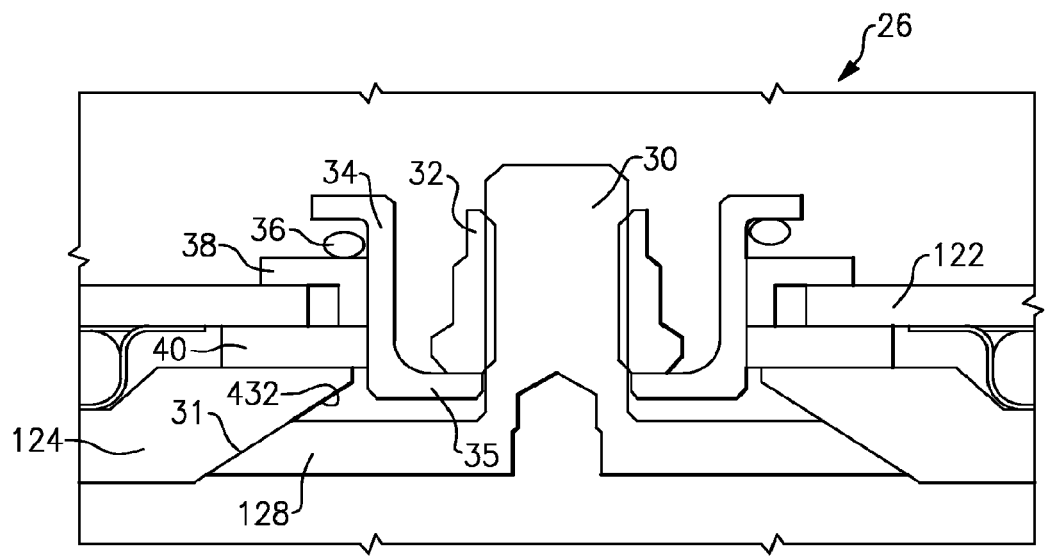
FIG. 3A shows a prior art fastener configuration.

As shown in FIG. 3A, in a prior art assembly, the head 128 of a fastener 30 which is incorporated into the fastener assembly 26 has a frustoconical surface 31 which meshes against a frustoconical surface or bore 432 in the panel 124.

A spacer 40 is positioned to separate the panel 124 and the underlying metal sheet 122. As will be described below, the size of the spacer is determined after measuring the other components.

A nut 32 is threaded onto the fastener 30, and tightened against a sleeve 34. The sleeve 34 "looks" for room to center the mating components, and ensure the nut is inside the fastener mechanism. The sleeve 34 also assists in inserting the nut and fastener into very tight spaces, as are typically encountered during the assembly of the panels to the metal sheets, particularly in after-market situations.

Figure 3B:
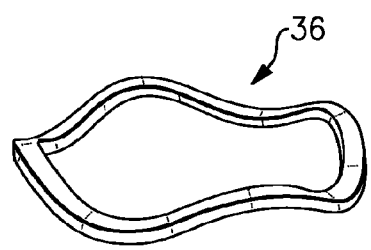
FIG. 3B shows the wave spring utilized in this prior art configuration.

A wave spring 36 (see FIG. 3B) sits between the sleeve 34 and a bushing 38. The spring 36 provides the joint, and flexibility to sustain an amount of preload without damage to the panel 124. The spring also allows the bolted portions of the fastener (30, 32, 34) to move vertically relative to the panel 124 as the components expand under different coefficients of thermal expansion, and due to the hot temperatures faced in an outer face of the panel 124.

Figure 4:
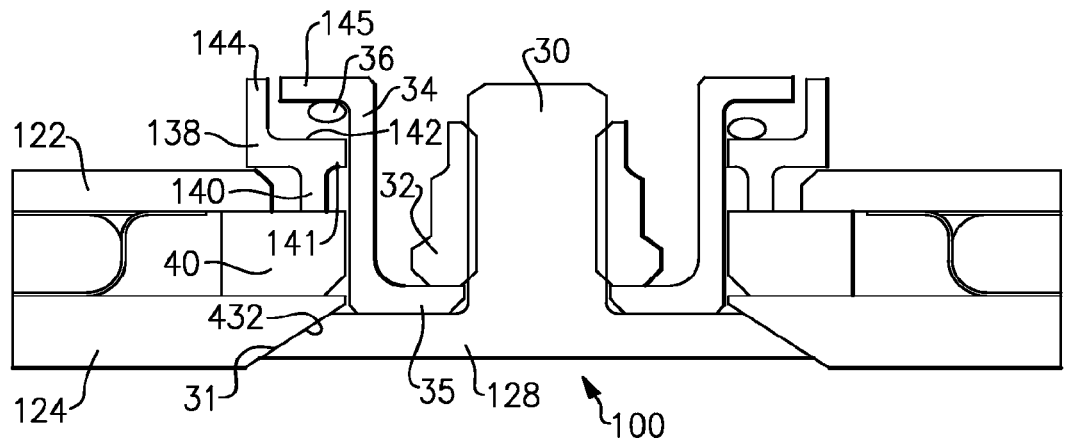
FIG. 4 shows a first embodiment of this invention.

FIG. 4 shows a first embodiment 100 of the present invention, wherein the bushing 138 is provided with an upwardly extending flange 144 which has a lower face or seat surface 142 to support the spring 36. The flange 144 extends upwardly and at a level to be equal with an outer lip 145 of the sleeve 34. In this manner, the flange 144 ensures that the spring 36 will not displace outwardly, but will remain captured at a desired location in a space defined by the lip 145, flange 144 and surface 142. The sleeve 138 is also provide with a downwardly extending leg 140 which sits against the spacer 40, and an inner end 141 of the seat surface which extends radially inwardly of the leg 140.

Figure 5:
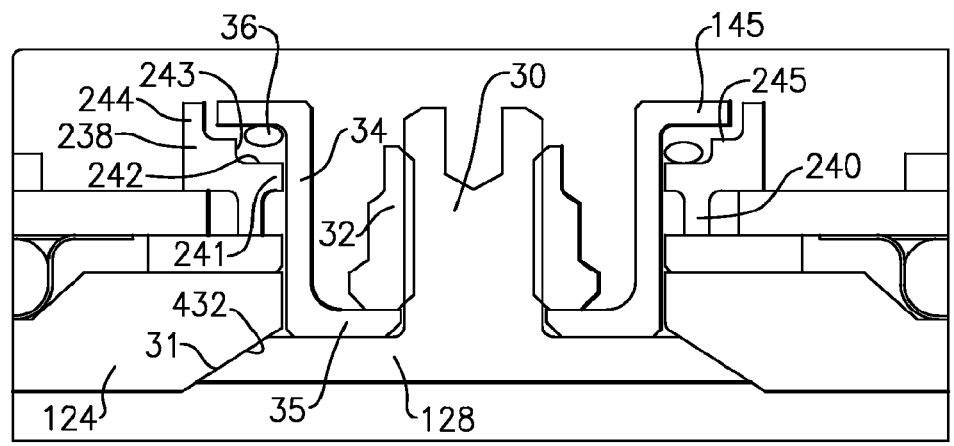
FIG. 5 shows a second embodiment.

FIG. 5 shows another embodiment 102 wherein the bushing 238 is provided with the flange 244, and the seat 242, the inner leg 241 and leg 240, all as in the FIG. 4 embodiment. However, a second shelf 243 and 245 is formed. The second shelf provides a surface to abut an inner face of the lip 145, and provide a stop against undue expansion of the joint. In addition, the radially inner ledge 243 better positions the spring 36.

In assembling this invention, a tool has a jig which is forced against a back face of the fastener, while the fastener sits within the bore in a panel. A desired height is defined, and a spacer is selected of an appropriate size.

Figure 6:
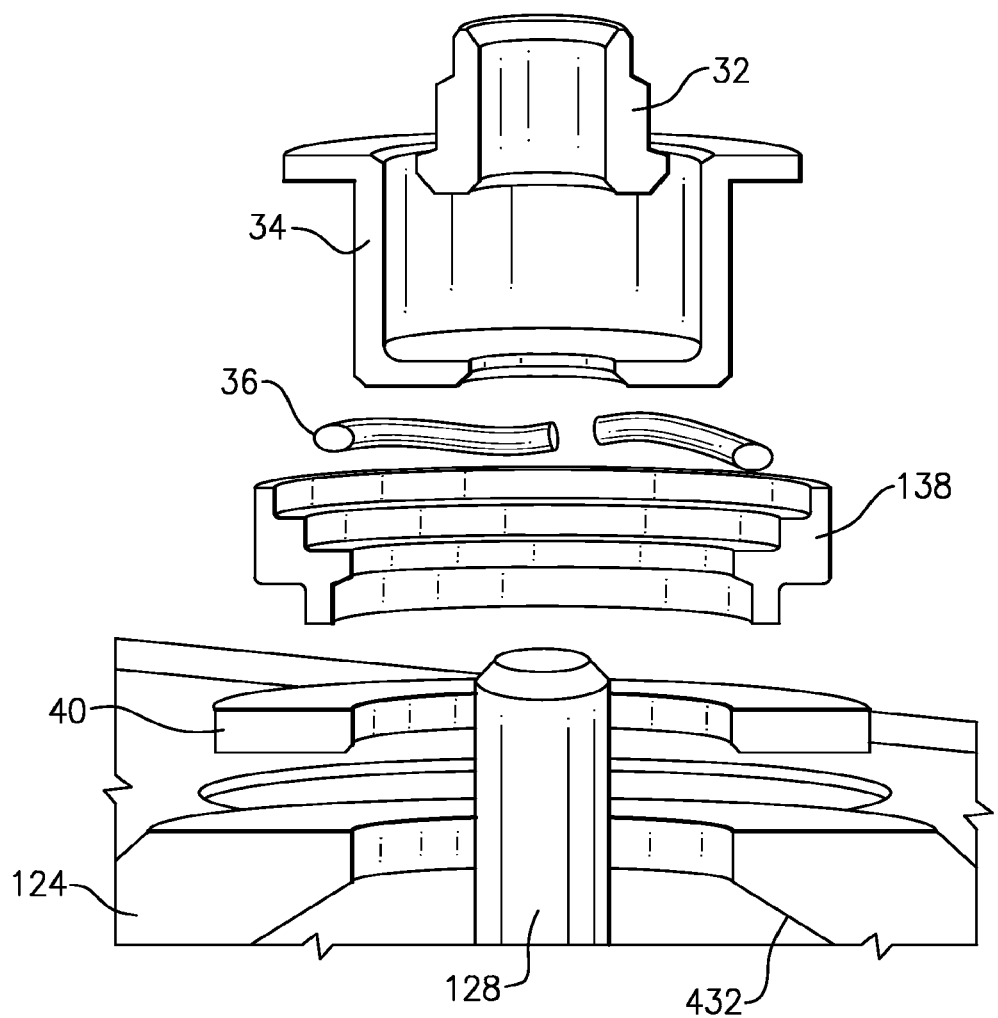
FIG. 6 shows the assembly steps.

As shown in FIG. 6, when assembling the fastener 128 initially placed within the bore 432. The spacer 40 may then be placed on the fastener. The bushing 138 may then be moved into the area, and the sleeve 34 dropped inwardly of the bore within the bushing, after placement of the spring 36. The nut 32 is then tightened. This arrangement allows for assembly from a cool side of the liner, and also without requiring any complex tooling or complex application of turning torque, etc.

In embodiments of this invention, the spring may be made of a high temperature, high strength spring material. The bushing, sleeve, metering sheet, spacer and nut may all be formed of a high temperature, high strength nickel alloy steel. Of course, other materials may be used.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. An assembly for use in a gas turbine engine comprising:
    an underlying metal sheet;
    at least one ceramic matrix composite panel attached to said metal sheet with at least one fastener assembly;
    said at least one fastener assembly including a fastener having a threaded portion extending rearwardly from a head, said head having a frustoconical surface facing said threaded portion, and said frustoconical surface of said head being received in a frustoconical bore in said ceramic matrix composite panel;
    a bushing positioned on an opposed side of said metal sheet from said ceramic matrix composite panel, and said bushing having a flange extending away from said metal sheet;
    a sleeve received about said threaded portion of said panel, and extending away from said panel, beyond said metal sheet, and having a lip extending radially outwardly toward said flange on said bushing, such that said flange on said bushing extends beyond a space defined between said lip and a seating surface on said bushing; and
    a wave spring received within said space.

2. The assembly as set forth in claim 1, wherein said bushing includes a separate shelf, including a radially inwardly facing surface which is positioned to define said space, and said flange being positioned radially outwardly of said radially inner surface, and extending outwardly beyond an inner surface of said lip.

3. The assembly as set forth in claim 1, wherein said sheet metal is part of a side wall for a gas turbine engine.

4. The assembly as set forth in claim 1, wherein said bushing has a leg extending downwardly toward said panel, and beyond said metal sheet.

5. The assembly as set forth in claim 4, wherein said seating surface on said bushing extends radially inwardly beyond a radially inner end of said leg, and toward said sleeve.

6. The assembly as set forth in claim 4, wherein said leg sits upon a spacer, said spacer being positioned between said metal sheet and said panel.

7. The assembly as set forth in claim 6, wherein a height of said spacer is selected to be appropriate for the particular distance between said sheet metal and said panel.

8. A nozzle side wall for use in a gas turbine engine comprising:
    an underlying metal sheet;
    at least one ceramic matrix composite panel attached to said metal sheet with at least one fastener assembly;
    said at least one fastener assembly including a fastener having a threaded portion extending rearwardly from a head, said head having a frustoconical surface facing said threaded portion, and said frustoconical surface of said head being received in a frustoconical bore in said ceramic matrix composite panel;
    a bushing positioned on an opposed side of said metal sheet from said ceramic matrix composite panel, and said bushing having a flange extending away from said metal sheet;
    a sleeve received about said threaded portion of said panel, and extending away from said panel, beyond said metal sheet, and having a lip extending radially outwardly toward said flange on said bushing, such that said flange on said bushing extends beyond a space defined between said lip and a seating surface on said bushing;
    a wave spring received within said space; and
    said bushing having a leg extending downwardly toward said panel, and beyond said metal sheet, said seating surface on said bushing extending radially inwardly beyond a radially inner end of said leg, and toward said sleeve, said leg sitting upon a spacer positioned between said sheet metal and said panel.

9. The flap as set forth in claim 8, wherein a height of said spacer is selected to be appropriate for the particular distance between said sheet metal and said panel.

* * * * *